(12) United States Patent
Kim et al.

(10) Patent No.: US 8,694,007 B2
(45) Date of Patent: Apr. 8, 2014

(54) METHOD FOR PROVIDING AND RECEIVING RELIABLE SERVICE IN WIRELESS COMMUNICATION SYSTEM

(75) Inventors: Juhee Kim, Daejeon (KR); Jae Sun Cha, Daejeon (KR); Kwang Jae Lim, Daejeon (KR); Soojung Jung, Daejeon (KR); Eunkyung Kim, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 101 days.

(21) Appl. No.: 13/381,898

(22) PCT Filed: Jul. 1, 2010

(86) PCT No.: PCT/KR2010/004294
§ 371 (c)(1),
(2), (4) Date: Dec. 30, 2011

(87) PCT Pub. No.: WO2011/002250
PCT Pub. Date: Jan. 6, 2011

(65) Prior Publication Data
US 2012/0115481 A1    May 10, 2012

(30) Foreign Application Priority Data

Jul. 1, 2009  (KR) .................. 10-2009-0059585
Jul. 1, 2010  (KR) .................. 10-2010-0063608

(51) Int. Cl.
*H04W 36/00* (2009.01)

(52) U.S. Cl.
USPC ........... 455/444; 455/436; 455/423; 455/574; 455/421; 370/331; 370/338

(58) Field of Classification Search
USPC ......... 455/444, 458, 421, 436, 41.2; 370/331, 370/338
See application file for complete search history.

(56) References Cited

U.S. PATENT DOCUMENTS 6,564,052 B1    5/2003    Kawano et al.
(Continued)

FOREIGN PATENT DOCUMENTS

JP    10-173592 A    6/1998
(Continued)

OTHER PUBLICATIONS

Ying Li, Zhouyue Pi, Baowei Ji, Jung Je Son, Anshuman Nigam, Andreas Meader, Linghang Fan, Ronny Yongho Kim, Kiseon Ryu, IEEE 802.16m Supporting Femtocell Low Duty Cycle Mode, IEEE C802.16m-09_0459r3, IEEE 802.16 Task Group m (TGm), Mar. 12, 2009.

(Continued)

*Primary Examiner* — Sharad Rampuria
(74) *Attorney, Agent, or Firm* — Rabin & Berdo, P.C.

(57) ABSTRACT

A method for providing reliable wireless service in a femto system is provided. The method includes broadcasting information about out-of-service, which notifies that an air interface based on the femto BS is disabled, to user equipment (UE); and disabling the air interface. The information about the out-of-service comprising an identifier about a recommended BS that is another BS which the UE can enter.
A method for receiving reliable service using user equipment (UE) in a wireless communication system is provided. The method includes receiving information about out-of-service, which notifies that service cannot be provided to the UE, from a femto base station (BS), the information about the out-of-service including an identifier about at least one recommended BS that is another BS which the UE can enter; and trying to enter one BS of the at least one recommended BS on the basis of the information about the out-of-service.

16 Claims, 4 Drawing Sheets

(56) References Cited

U.S. PATENT DOCUMENTS

| | | | |
|---|---|---|---|
| 8,112,097 B2* | 2/2012 | Nakayama | 455/456.1 |
| 8,254,934 B2* | 8/2012 | Kwon et al. | 455/437 |
| 8,305,966 B2* | 11/2012 | Chou | 370/328 |
| 8,315,208 B2* | 11/2012 | Cho et al. | 370/328 |
| 8,331,948 B2* | 12/2012 | Park et al. | 455/450 |
| 8,340,657 B2* | 12/2012 | Ahn et al. | 455/422.1 |
| 8,355,728 B2* | 1/2013 | Jung et al. | 455/444 |
| 8,588,778 B2* | 11/2013 | Majmundar et al. | 455/436 |
| 2009/0156213 A1 | 6/2009 | Spinelli et al. | |
| 2009/0247170 A1* | 10/2009 | Balasubramanian et al. | 455/445 |
| 2010/0159917 A1* | 6/2010 | Majmundar et al. | 455/423 |
| 2011/0287759 A1* | 11/2011 | Jung et al. | 455/422.1 |

FOREIGN PATENT DOCUMENTS

| | | |
|---|---|---|
| JP | 2000-278303 A | 10/2000 |
| JP | 2008-219645 A | 9/2008 |
| KR | 2000-0002300 A | 1/2000 |
| KR | 10-0756193 B1 | 9/2007 |
| WO | WO 2010077002 A2 * | 7/2010 |

OTHER PUBLICATIONS

Mo-Han Fong, Hang Zhang, Robert Novak, Sophie Vrzic, Jun Yuan, Dongsheng Yu, Hosein Nikopourdeilami, Kathiravetpillai Sivanesan, Proposed Text Changes on 3rd Draft HO SDD Text (HO AHG), IEEE C802.16m-08/1214, IEEE 802. 16 Task Group m (TGm), Sep. 15, 2008.

Masato Okuda, Wei-Peng Chen, Yanling Lu, MS Context Transfer for optimized HO process, IEEE C802.16j-08/078r2, IEEE 802.16's Relay Task Group, Mar. 18, 2008.

Ying Li, Zhouyue Pi, Baowei Ji, Kaushik Josiam, Sudhir Ramakrishna, Jiann-An TsaiMihyun Lee, Rakesh Taori, On Scheduling System Information Sub-Packets in Super Frame Header, IEEE C802.16m-09/0962, IEEE 802. 16 Task Group m (TGm), Apr. 27, 2009.

* cited by examiner

Figure 4

METHOD FOR PROVIDING AND RECEIVING RELIABLE SERVICE IN WIRELESS COMMUNICATION SYSTEM

TECHNICAL FIELD

The present invention relates to wireless communications, and more particularly, to a method for providing and receiving reliable wireless service in a femto system.

BACKGROUND ART

With development of communications and a spread of multimedia technology, various large-capacity transmission technologies have been applied to a wireless communication system. As a method for increasing wireless capacity, there is a method of assigning more frequency resources, but there is a limit to assign more frequency resources among restricted frequency resources to many users. One of methods for more efficiently utilizing the restricted frequency resources, there is a method of making a small cell. If the size of the cell is made small, the number of users one base station has to give service is decreased, so that the base station can assign more frequency resources to users. As the size of the cell is made small, it is possible to offer better large-capacity service to many users.

In an institute of electrical and electronics engineers (IEEE) 802.16 task group that chooses the next-generation air interface standards and a nonprofit worldwide interoperability for microwave access (WiMAX) forum that provides service and network standards for a broadband wireless connection system based on IEEE 802.16, standardization has been being achieved for a wireless connection system supporting a femto-cell to enhance efficiency of the system and improve quality of service (QoS) under an indoor environment. The WiMAX forum defines a femto base station as a low-power inexpensive base station connected to an Internet protocol (IP) network through a fixed wireless link or a local broadband wired link. The femto base station is connected to the IP network spread in a home or an office, and accesses a core network of a mobile communication system through the IP network, thereby providing mobile communication service. That is, the femto base station may be connected to the core network of the mobile communication system through a digital subscriber line (DSL). A user of the mobile communication system may receive the service in the outdoors through the existing macro-cell, but receive the service in the indoors through the femto-cell. The femto-cell improves indoor coverage of the mobile communication system by making up for that the service of the existing macro-cell becomes deteriorated in a building, and provides the service intended for the a specific user, thereby providing voice and data service of high quality. Further, the femto-cell can provide a new service not given in the macro-cell, and the spread of the femto-cell may cause fixed-mobile convergence (FMC) to be accelerated and an industrial-based cost to be reduced.

The service of the femto base station is affected by a line error of the IP network, software rebooting, power down, etc. For example, the femto base station may be temporarily turned off or disconnected from the core network of the mobile communication system, and thus the femto base station may be out of service. The WiMAX document 'Requirements for WiMAX Femto-cell System v.1.0.0' states that an air interface has to be instantly disabled in the case of abnormal operation of the femto base station. Also, 'IEEE 802.16m System Description Document (SDD)' specifies the following for ensuring the reliability of the femto base station. If the communication between the service providing network and the femto base station is disconnected for a certain period of time, the femto base station 1) disables the air interface immediately, 2) presents a way such as a handover to the base station in order to give service continuity to sub users, and 3) notifies a new user not to enter from another cell.

In other words, when inactivating the air interface, the femto base station has to not only notify being out of service but also give a handover command to sub user equipments (UE). Also, the UEs notified by the femto base station about being out of service have to be instantly handed over to a neighboring cell. In this case, a plurality of user equipments performs the handover at the same time, so that the handover may be delayed due to handover procedure in the plurality of user equipments.

Accordingly, a method is required for more efficiently performing the handover procedure as the femto base station is out of service. Also, there is a need of a method for specifically announcing that the service is out, so as to make a user equipment at an idle mode do not camp to a base station of which the air interface is scheduled to be disabled.

SUMMARY OF INVENTION

Technical Problem

The present invention provides a method of performing a handover for providing continuous service to user equipment when a femto base station is out of service.

Technical Solution

In an aspect of the invention, there is provided a method for providing reliable service using a femto base station (BS) in a wireless communication system. The method includes, broadcasting information about out-of-service, which notifies that an air interface based on the femto BS is disabled, to user equipment (UE); and disabling the air interface. The information about the out-of-service comprising an identifier about a recommended BS that is another BS which the UE can enter.

The method may further include storing context information of the UE.

The information about the out-of-service may include information about reason of the out-of-service and information about an expected time of shutting the service down.

The information about the out-of-service may be transmitted through a broadcast message or a paging message.

The recommended BS may be a macro BS that provides larger coverage than the femto BS.

The recommended BS may be another femto BS.

The method may further include transmitting context information of the UE to the recommended BS.

The method may further include receiving acknowledgement from the recommended BS as response to the context information of the UE.

The method may further include transmitting recovery information that notifies service recovery if service of the femto BS is recovered.

The method may further include setting a cell bar indication for indicating that an entry into the femto BS is prevented.

The cell bar indication is included in a secondary superframe header (S-SFH).

In another aspect of the invention, there is provided a method for receiving reliable service using user equipment (UE) in a wireless communication system. The method includes receiving information about out-of-service, which notifies that service cannot be provided to the UE, from a femto base station (BS), the information about the out-of-service including an identifier about at least one recommended BS that is another BS which the UE can enter and trying to enter one BS of the at least one recommended BS on the basis of the information about the out-of-service.

The information about the out-of-service may include reason of the out-of-service; and an expected downtime.

The trying to enter one BS of the at least one recommended BS may be transmitting a ranging request message for a handover, which includes an identifier about the one BS.

The ranging request message may be transmitted to the at least one recommended BS or a neighboring BS to the femto BS.

The information about the out-of-service may be received through a broadcast message or a paging message.

The at least one recommended BS may be a macro BS of which a cell region is overlapped with a cell region of the femto BS.

Advantageous Effects

If an air interface operation of a femto base station is suspended, it is possible to support a prompt handover of sub user equipments and prevent entering a network from another cell. Also, when the service of the femto base station is recovered, the user equipment can efficiently reenter the femto base station.

MODE FOR INVENTION

Below, exemplary embodiments of the present invention will be described in detail with reference to accompanying drawings so as to be easily realized by a person having ordinary knowledge in the art. However, the present invention may be embodied in various forms without being limited to the exemplary embodiments set forth herein. In the drawings, unrelated parts are omitted for clearly explaining the present invention, and like reference numerals refer to like elements throughout. Further, descriptions of a part that can be easily appreciated by those skilled in the art are omitted.

The following technology may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented by radio technology such as institute of electrical and electronics engineers (IEEE) 802.11 (Wi-Fi), IEEE 802.16e (WiMAX), IEEE 802-20, evolved UTRA (E-UTRA), etc. The UTRA is a part of a universal mobile telecommunications system (UMTS). $3^{rd}$ generation partnership project (3GPP) long term evolution (LTE) is a part of evolved UMTS (E-UMTS) using the E-UTRA, which employs the OFDMA for a downlink but the SC-FDMA for an uplink. IEEE 802.16m is evolved from IEEE 802.16e.

Figure 1:
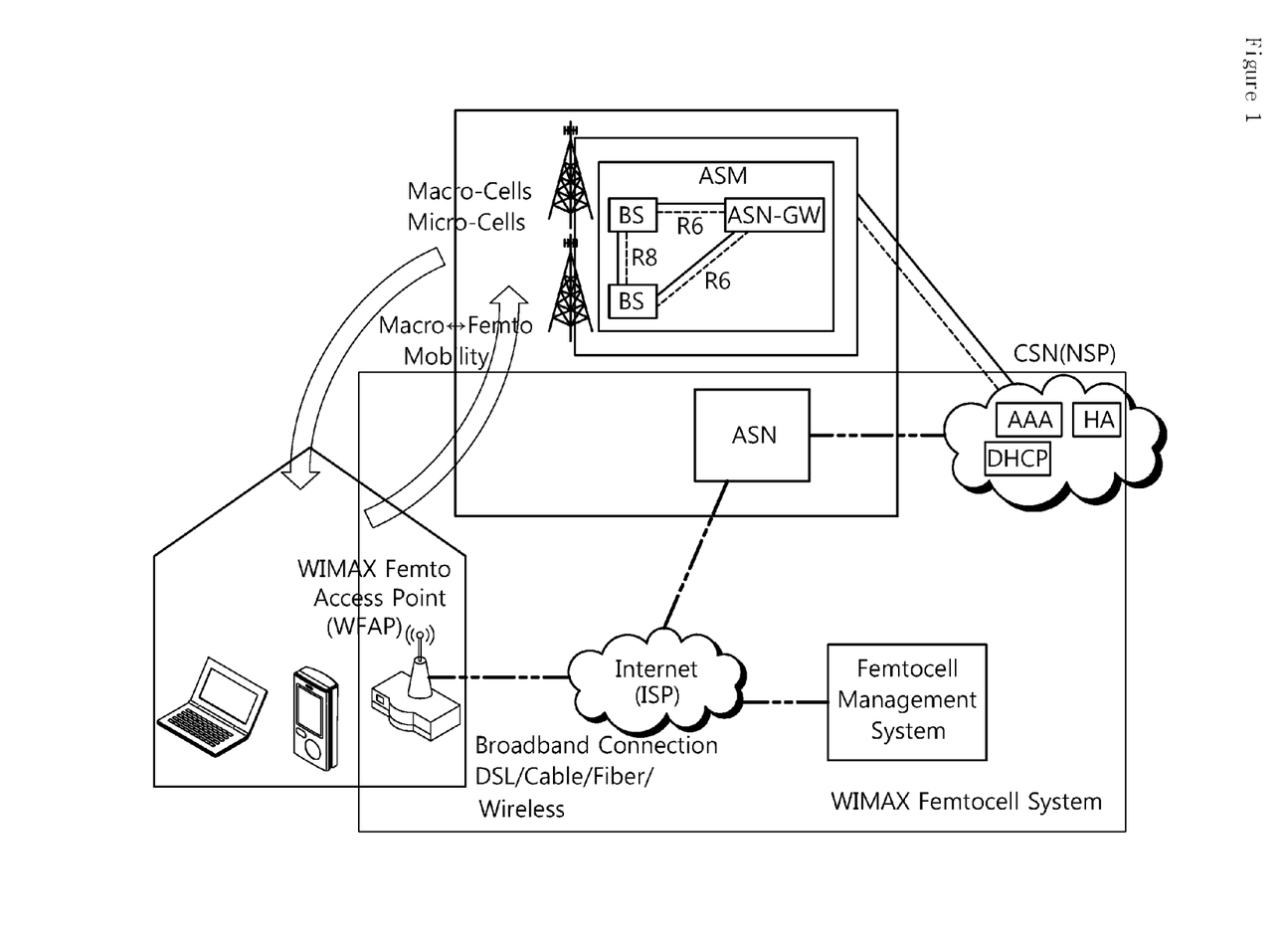
FIG. 1 shows an example of a WiMAX system that supports a femto-cell.

FIG. 1 shows an example of a WiMAX system that supports a femto-cell.

Referring to FIG. 1, a general wireless communication system includes user equipment (UE) and a base station (BS). The wireless communication system is widely located for providing various communication services such as voice, packet data, etc.

The UE may be fixed or mobile, which may be also called a mobile station (MS), a user terminal (UT), a subscriber station (SS), a wireless device, etc. The base station generally refers to a fixed station that communicates with the UE, which may be also called a node-B, a base transceiver system, an access point, etc. One base station may include one or more cells.

The base station may be classified into a femto BS and a macro BS according to cell coverage or location. The cell of the femto BS is smaller than the cell of the macro BS. The cell of the femto BS may be entirely or partially overlapped with the cell of the macro BS. Thus, a structure where a small cell is overlappingly located within a large cell is called a hierarchy cell structure. The femto BS may be also called a femto-cell, a home node-B, a closed subscriber group (CSG), a WiMAX femto access point (WFAP), etc. The macro BS may be called a macro-cell as opposed to the femto-cell.

The UE that belongs to the femto BS is called a femto UE, and the UE that belongs to the macro BS is called a macro UE. The femto UE can become the macro UE through a handover to the macro BS, and the macro UE can become the femto UE through a handover to the femto BS.

In the femto BS, broadband connection to Internet provided by an Internet service provider (ISP) is possible through a digital subscriber line (DSL), a cable, an optical fiber, wireless, etc. The femto BS may be connected to a femto-cell management system and an access service network (ASN) of a mobile communication system through Internet. The femto management system may perform registration, authentication, security procedures, etc. of the femto BS so that the femto BS can access a connectivity service network of the mobile communication system.

The femto BS may be installed by a home user or a small office home office (SOHO) user. The femto BS undergoes Plug & Play and is capable of providing service like that of the macro BS as well as an idle mode. Several tens to several hundreds of femto BSs may be installed within a cell zone of the macro BS, and the femto BS can improve service of a blanket zone instead of the existing relay and lighten load of the macro BS.

The femto BS for an open subscriber group (OSG) operates like the macro BS when calling the UE. The femto BS for a closed subscriber group (CSG) may broadcast a paging message to only the UE that belongs to a relevant CSG. In accordance with topology for supporting the femto BS and the macro BS, one or more paging groups may be assigned to the femto BS or the macro BS. The overlapped macro BS and femto BS may share the same paging group identifier (ID) with each other. To support the idle mode of the femto BS, the OSG and the CSG may be defined by consulting 'system description document of IEEE 802.16 task group m.'

Below, the downlink means transmission from the base station to the UE, and the uplink means communication from the UE to the base station. In the case of the downlink, a transmitter may be a portion of the base station, and a receiver may be a portion of the UE. In the case of the uplink, the transmitter may be a portion of the UE, and the receiver may be a portion of the base station.

Figure 2:
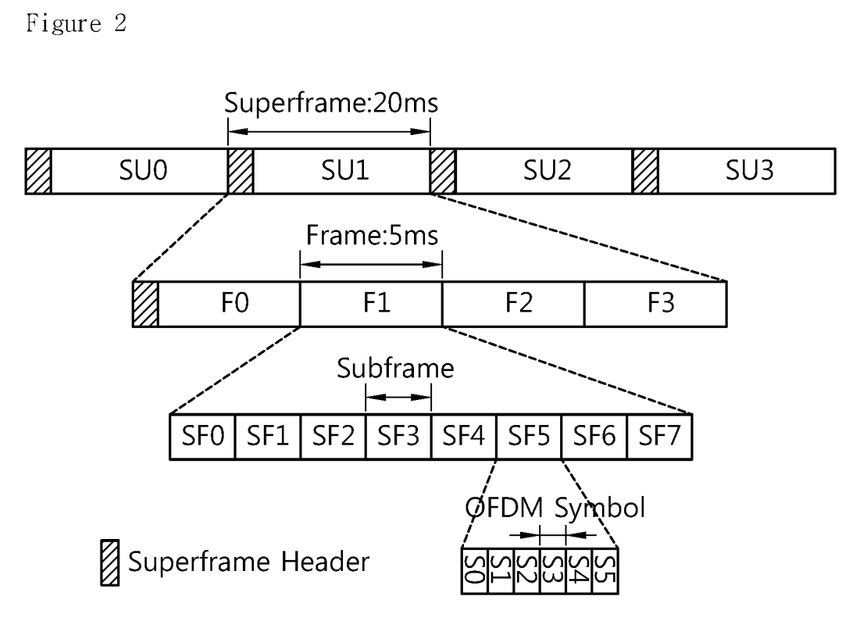
FIG. 2 shows an example of a frame structure.

FIG. 2 shows an example of a frame structure, which may show a frame structure of at least one of the macro-cell and the femto-cell in the hierarchy cell structure.

Referring to FIG. 2, a superframe includes a superframe header SFH and four frames F0, F1, F2 and F3. For example, each superframe has a length of 20 ms and each frame has a length of 5 ms, but not limited thereto. The superframe header may be arranged at the head of the superframe, and a common control channel may be assigned to the superframe header. The common control channel is a channel used for transmitting information about frames constituting the superframe or control information utilized in common like system information by all UEs within the cell. Further, a synchronization channel may be arranged within the superframe header or neighboring to the superframe so as to transmit a synchronization signal. The synchronization signal may represent cell information such as a cell identifier (ID).

The superframe header includes a primary superframe header (P-SFH) and a secondary superframe header (S-SFH).

The primary superframe header is provided at the first frame of each superframe, and the primary superframe header is configured as follows.

TABLE 1

| Syntax | Size (bit) |
| --- | --- |
| LSB of Superframe Number | 4 |
| S-SFH Change Count | 4 |
| S-SFH Size | 4 |
| S-SFH Transmission Format | 2 |
| S-SFH Scheduling Information bitmap | 3 |
| S-SFH SP Change Bitmap | 3 |
| Reserved | 4 |

The primary superframe header is included in every superframe, and informs whether a secondary superframe is included in a current superframe, a renewal number of system information supported by the current superframe, etc.

The secondary superframe header is classified into three secondary superframe header subpackets (S-SFH SP) according to its characteristics, and each of the secondary superframe header subpackets is used for broadcasting system information, which is required for a mobile UE to access the base station, to the mobile UE. Each secondary superframe header subpacket may be transmitted in transmission cycles different according to the characteristics of the contained system information. For example, the secondary superframe header subpacket1 may be transmitted in a cycle of 2 superframes, the secondary superframe header subpacket2 may be transmitted in a cycle of 3 superframes, and the secondary superframe header subpacket3 may be transmitted in a cycle of 4 superframes.

One frame includes a plurality of subframes SF0, SF1, SF2, SF3, SF4, SF5, SF6 and SF7. Each subframe may be used for uplink or downlink transmission. The subframe may include 6 or 7 OFDM symbols, but this is nothing but an example. Here, a time division duplexing (TDD) method or a frequency division duplexing (FDD) method may be applied to the frame. In the TDD method, each subframe is used for the uplink or downlink transmission in different times at the same frequency. That is, the subframes within the frame of the TDD method are divided into an uplink subframe and a downlink subframe in a time domain. In the FDD method, each subframe is used for the uplink and downlink transmission in different frequencies at the same time. That is, the subframes within the frame of the FDD method are divided into an uplink subframe and a downlink subframe in a frequency domain. The uplink transmission and the downlink transmission may be performed simultaneously while occupying different frequency bands from each other. Each subframe may include a subframe header. The subframe header may contain wireless-resource assignment information or the like.

The subframe includes at least one frequency partition. The frequency partition includes at least one physical resource unit (PRU). The frequency partition may include a localized PRU and/or a distributed PRU. The frequency partition may be used for different purposes of fractional frequency reuse (FFR) or multicast and broadcast services (MBS).

The PRU is defined as a basic physical unit for resource assignment, which includes a plurality of successive OFDM symbols and a plurality of successive subcarriers. The number of OFDM symbols included in the PRU may be equal to the number of OFDM symbols included in one sub frame. For example, if one subframe includes 6 OFDM symbols, the PRU may be defined as 18 subcarriers and 6 OFDM symbols. A logical resource unit (LRU) is a basic logical unit for distributed resource assignment and localized resource assignment. The LRU is defined as a plurality of OFDM symbols and a plurality of subcarriers, and includes pilots used in the PRU. Thus, in one LRU, a proper number of subcarriers depend on the number of assigned pilots.

A logical distributed resource unit (DRU) may be used for acquiring a frequency diversity gain. The DRU includes a subcarrier group distributed within one frequency partition. The size of the DRU is the same as the size of the PRU. A minimum unit forming the DRU is one subcarrier.

A logical contiguous resource unit (CRU) may be used for acquiring a frequency selective scheduling gain. The CRU includes a localized subcarrier group. The size of the CRU is the same as the size of the PRU.

Now, a method of performing a handover procedure due to out-of-service and service recovery of the femto BS will be described. A service state of the femto BS includes the out-of-service and the service recovery. The out-of-service means that the air interface of the femto BS is disabled, and the service recovery means that the femto BS is changed from the out-of-service to have an enabled air interface. The out-of-service of the femto BS may be divided into scheduled out-of-service and unscheduled out-of-service. For example, if a reboot is needed because of download/installation or the like of software or if the femto BS is scheduled to be turned off, the femto BS may operate to be out of service as scheduled. The unscheduled out-of-service may occur when the femto BS cannot schedule the out-of-service, for example, when power for the femto BS is off or a backhaul link is suddenly disconnected.

Figure 3:
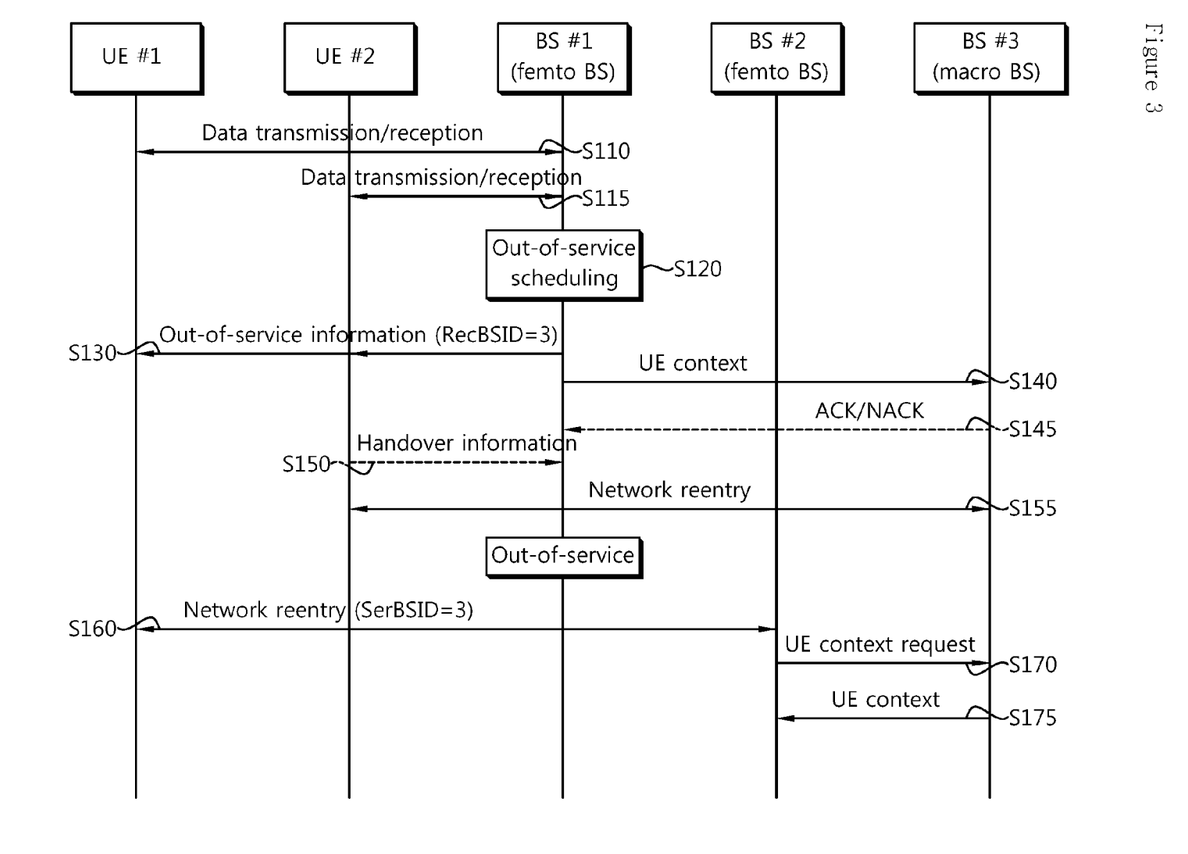
FIG. 3 shows a method of performing a handover procedure due to a scheduled out-of-service of a femto base station according to an exemplary embodiment of the present invention.

FIG. 3 shows a method of performing a handover procedure due to a scheduled out-of-service of a femto base station according to an exemplary embodiment of the present invention.

Referring to FIG. 3, suppose that a UE #1 accesses a BS #1 (hereinafter, referred to as a femto BS #1) and receives data (S110), and a UE #2 accesses a femto BS #1 and receives data (S115).

The femto BS #1 schedules the out-of-service (S120). The femto BS #1 can schedule the out-of-service in accordance with a reboot for download/installation of software, an operation policy of the femto-cell, etc. That is, the femto BS #1 performs the scheduled out-of-service. In the case that the femto BS #1 can use a battery, the scheduled out-of-service may be performed using the battery for a certain time if main power of the femto BS #1 is cut off. Here, the scheduled out-of-service of the femto BS can be performed in the case that there exist the UE of transmitting and receiving data, but not limited thereto. Alternatively, the scheduled out-of-service of the femto BS may be performed even when all UEs receiving the service from the femto BS is in an idle mode or a sleep mode.

The femto BS #1 transmits information about the out-of-service to the UE (S130). The information about the out-of-service may be transmitted repetitively at least two times through a broadcast message or a paging message until the scheduled out-of-service is performed. Also, the information about the out-of-service may be an AAI_self organizing networks (SON)-ADV message.

The UE #1 and the UE #2 can receive the information about the out-of-service, and regard it as command message for fulfilling a handover. Along with the transmission of the information about the out-of-service, a cell bar indication included in a superframe header (SFH) or a secondary superframe header (S-SFH) is set into 1 to thereby prevent entry/reentry to the femto BS #1 from another cell. The cell bar indication indicates whether the UE is allowed to enter/reenter the network, which allows the UE to enter/reenter the network when it is 0, but prevents the UE from entering/reentering the network when it is 1. The UE, which tries to enter/reenter the network through the femto BS #1, ascertains that the cell bar indication included in the SFH or S-SFH is designated as 1 and does not enter/reenter the network.

The information about the out-of-service may include reason of the out-of-service, an expected downtime, an expected uptime, a recommended BS ID, etc. The expected downtime indicates time when the femto BS is out of service in accordance with the schedule of the out-of-service, and the expected uptime indicates time when the service of the femto BS is recovered and restarted or a period from the out-of-service to the service recovery. The expected uptime may be included or not included in the information about the out-of-service since it is an option. When the expected uptime elapses, the UE handed over to another BS due to the out-of-service can scan the previously registered femto BS even though there is no instruction on whether or not to return to the previous femto BS again through the handover.

The reason of the out-of-service shows reasons of shutting the service down, such as shutdown of the femto BS, backhaul link down, etc. Also, the reason of the out-of-service may mean resource adjustment. When the resource adjustment of the femto BS is performed due to interference mitigation that may affect several UEs previously registered to the femto BS #1, the femto BS may be used in transmitting meaning about resource adjustment information to prevent dependent UEs from being out of service. Specifically, the reason of the out-of-service included in the information about the out-of-service may be formed as a field having the size of 2 bits, and the meaning of bit values is as follows.

TABLE 2

| Bit values | Category | Meaning |
|---|---|---|
| 00 | Reason of out-of-service | Power down |
| 01 | Resource adjustment information | Power decrease |
| 10 | Resource adjustment information | FA change |
| 11 | Reason of out-of-service | Backhaul link down |

The recommended BS means a latent BS that can be used as a target BS to which the UE being on the service provided by the femto BS #1 tries the handover (HO). Also, the recommended BS may be a BS, to which context information about the UE being on the service provided by the femto BS #1 has been transmitted, or a neighboring BS. The recommended BS may be a macro BS or another femto BS, of which a cell region is overlapped with that of the femto BS #1. The recommended BS ID indicates ID of the BS, to which context information about the UE being on the service provided by the femto BS #1 has been transmitted, or the neighboring BS. The recommended BS ID may include at least one BS ID. To the recommended BS, information about the UE being on the service provided by the femto BS #1 may be transmitted. The UE first considers one of the recommended BSs as the target BS for the handover. In this exemplary embodiment, a BS #3 (hereinafter, referred to as the macro BS) is designated as the recommended BS (RecBSID=3).

The information about the out-of-service may further include indication that informs the UE of whether the handover will be coordinated when performed and allows the UE to determine whether to perform what handover procedure.

The femto BS #1 transmits the context information of the UE to the macro BS through a backbone network (S140). That is, the macro BS is employed as the recommended BS. The femto BS #1 transmits the context information of the UE to the macro BS so that the UE can be more quickly handed over. The macro BS may transmit an acknowledgement (ACK) signal in response to the context information of the UE received from the femto BS #1, and a non acknowledge (NACK) signal as necessary (S145).

In addition, the femto BS #1 may store the context information of the UE being on the service. The context information of the UE may include basic capabilities and security capabilities. The context information allows an AMS to perform an optimized process of a reentry into the femto BS #1 when the femto BS #1 is recovered to provide the service again.

Assume that the UE #1 performs the handover to the BS #2 (hereinafter, referred to as the femto BS #2) and the UE #2 performs the handover to the macro BS.

The UE #2 may transmit handover information to the femto BS #1 if it is estimated that the handover is performed within the expected down time (S150). The femto BS #1 can support the handover procedure of the UE #2 before being out of service, and the UE #2 can perform a network reentry into the macro BS (S155). The UE #2 transmits a ranging request message for the handover, and the macro BS transmits a ranging response message in response to the ranging request message. The ranging request message may include the recommended BS ID in addition to a serving BS ID. The macro BS can more efficiently support the network reentry of the UE #2 on the basis of the context information previously received from the femto BS #1.

The UE #1 may transmit the ranging request message containing the recommended BS ID (SerBSID=3) if it is assumed that the handover wouldn't be performed within the expected down time or if communication with the femto BS

1 is disconnected while performing the handover, thereby performing the network reentry (S160). That is, the UE #1 transmits the ranging request message by inputting the ID of the macro BS, i.e., the ID of the recommended BS to which the context information of the UE is previously transmitted, to the serving BS ID.

The femto BS #2 ascertains the serving BS ID included in the ranging request message received from the UE #1, and requests the context information to the macro BS (S170). The macro BS transmits the context information of the UE to the femto BS #2 (S175). The femto BS #2 acquires the context information of the UE from the macro BS, i.e., the recommended BS, and thus efficiently supports the network reentry of the UE #1.

Figure 4:
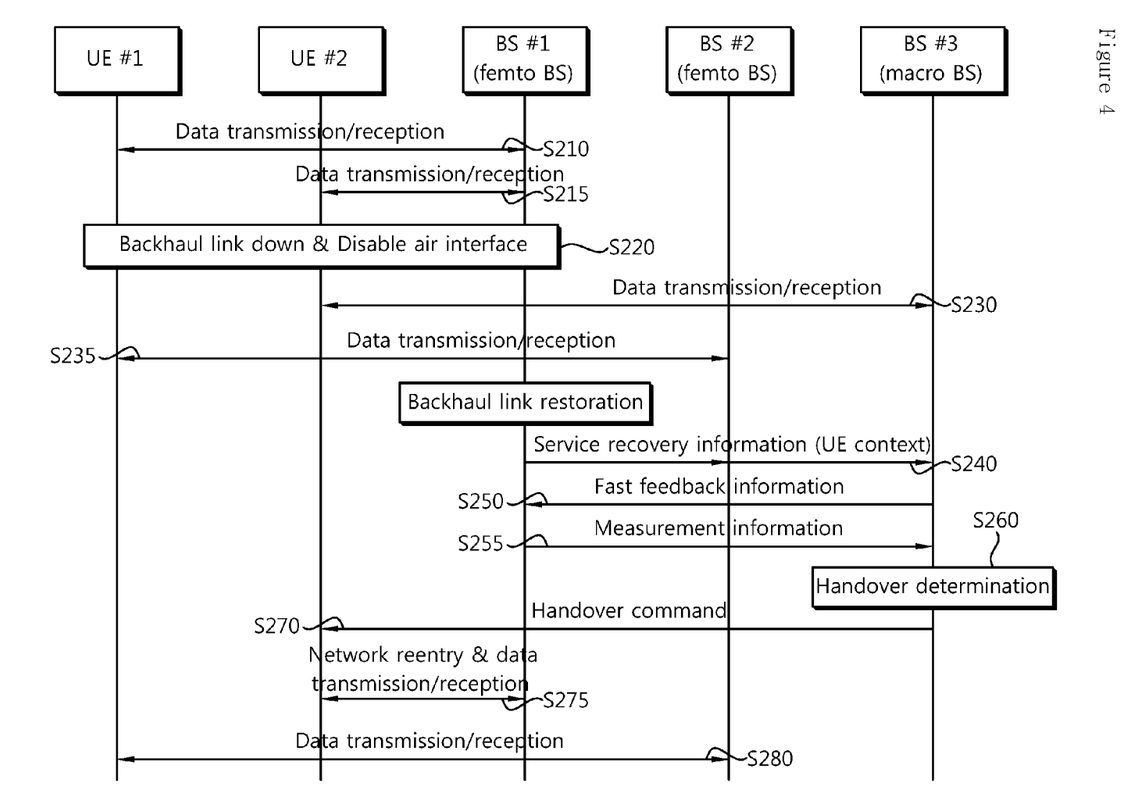
FIG. 4 shows a method of performing a handover procedure as the service of the femto base station is recovered, according to an exemplary embodiment of the present invention.

FIG. 4 shows a method of performing a handover procedure as the service of the femto base station is recovered, according to an exemplary embodiment of the present invention.

Referring to FIG. 4, after the backhaul link down and the disabled air interface of the femto BS, the handover procedure is performed in accordance with the backhaul link recovery of the femto BS.

Suppose that the UE #1 and the UE #2 access the femto BS #1 and transmit/receive data (S210, S215). The femto BS #1 disables the air interface if the backhaul link is disconnected for a preset time or more (S220). At this time, the femto BS #1 maintains the context information of the UE (e.g., an ID list of the UE) to which the femto BS #1 provides service. The context information of the UE stored in the femto BS #1 may be used for efficiently supporting the network reentry when the backhaul link of the femto BS #1 is normally recovered and thus the UEs handed over to the neighboring BS performs the handover again to the femto BS #1.

Suppose that the UE #2 transmits/receives data with the macro BS by performing the handover procedure to the macro BS (S230) and the UE #1 transmits/receives data with the femto BS #2 by performing the handover procedure to the femto BS #2 (S235). The handover procedures of the UE #1 and the UE #2 may be performed as described with reference to FIG. 3.

The femto BS #1 informs the neighboring BSs of the service recovery when the backhaul link is recovered (S240). That is, the femto BS #1 notifies the neighboring BSs of the service recovery when the service is recovered with regard to the UE. The information about the service recovery is transmitted to the current serving BS that provides the service to the UE through a backhaul network interface. FIG. 4 shows a case that the backhaul link is recovered, but not limited thereto. Alternatively, the case may include that the femto BS #1 restarts the service.

The information about the service recovery includes the ID of the femto BS #1, the status of the femto BS #1, the context information of the UE stored in the femto BS #1, etc. The status of the femto BS means information about initialization, the recovery from the backhaul link down, or the like of the femto BS. The context information of the UE includes the ID of the UE to which the femto BS provides the service.

The macro BS that receives the information about the service recovery ascertains the ID of the UE included in the context information of the UE, and transmits information about assigned fast feedback to the relevant UE (UE #2) (S250). The fast feedback is used for transmitting information required to be quickly responded by the BS. A channel for the fast feedback may include at least one of the PRU and the CRU.

The femto BS #1 measures a fast feedback report of the UE #2 and transmits measurement information to the macro BS (S225). That is, the femto BS #1 can measure a channel status of the UE #2 through the fast feedback report transmitted from the UE #2, and reports it to the macro BS so as to determine whether to perform the handover with respect to the UE #2. The measurement information about the channel status may be represented as a carrier to interference and noise ratio (CINR) or received signal strength indication (RSSI).

The macro BS determines whether to perform the handover of the UE #2 on the basis of the measurement information received from the femto BS #1 (S260). If it is determined that the channel status of the UE #2 received from the femto BS #1 is better than a critical value, the macro BS determines to make the UE #2 perform the handover to the femto BS #1.

In accordance with cell-type based and mobility-management policy of a current service-providing BS and a previous service-providing BS such as the femto BS #1, the current service providing BS for the UE, such as the macro BS, may make the UE perform the handover for returning to the previous service providing femto BS. At this time, the previous service-providing femto BS such as the femto BS #1 has top priority as a target BS for the handover.

If it is determined to make the UE #2 be handed over to the femto BS #1, the macro BS transmits a handover command message to the UE #2 (S270). The UE #2 performs the handover procedure to the femto BS #1 in response to the handover command message, and reenters the network to thereby transmit/receive data with the femto BS #1 (S275). The femto BS #1 can support the network reentry and data communication of the UE #2 on the basis of the context information of the UE stored therein.

The femto BS #2, which receives the information about the service recovery from the femto BS #1, performs the same procedure as the macro BS with respect to the UE #1. At this time, if the UE #1 has already been out of a cell region of the femto BS #1, the handover command message may not be transmitted. If the UE #1 is out of the cell region of the femto BS #1 and thus receives no handover command message, the UE #1 may keep data communication with the femto BS #2 (S280).

The handover procedure due to the backhaul link recovery of the femto BS may be applied to an initialization process of the femto BS. When the femto BS is powered on and auto-configuration is performed, the femto BS transmits service initiation information to the macro BS or the neighboring femto BS, of which the cell region is overlapped with the femto BS. The service initiation information corresponds to the foregoing service recovery information. The BS, which receives the service initiation information, may notify the UE being on the service of the assigned fast feedback information as necessary, and the femto BS may measure the channel status of the relevant UE on the basis of the fast feedback information and transmit the measurement information with regard to a fast feedback channel of which the CINR or the RSSI representing the channel status of the UE is higher than a preset critical value. The BS that receives the measurement information from the femto BS may request the relevant UE to scan the channel or command the relevant UE to perform the handover to the femto BS on the basis of the measurement information.

All the foregoing functions may be implemented by a processor such as a microprocessor, a controller, a microcontroller, an application specific integrated circuit, etc. based on software, a program code or the like coded to perform the above functions. The design, development and achievement of the code may be apparent to those skilled in the art on the basis of the description of the present invention.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for providing reliable service by a femto base station (BS) in a wireless communication system, the method comprising:
broadcasting, by the femto BS to user equipment (UE), information about out-of-service, the information indicating that an air interface based on the femto BS is to be disabled, and
including an identifier of another BS that is accessible to the UE; and
disabling the air interfaces,
wherein the information about the out-of-service includes information about reason of the out-of-service.

2. The method of claim 1, further including storing context information of the UE.

3. The method of claim 1, wherein the another BS is a macro BS that provides larger coverage than the femto BS.

4. The method of claim 1, wherein the another BS is another femto BS.

5. The method of claim 1, further including transmitting context information of the UE to the another BS.

6. The method of claim 5, further including receiving acknowledgement from the another BS as a response to the context information of the UE.

7. The method of claim 1, further including transmitting recovery information that notifies service recovery if service of the femto BS is recovered.

8. A method for providing reliable service by a femto base station (BS) in a wireless communication system, the method comprising:
broadcasting, by the femto BS to user equipment (UE), information about out-of-service, the information indicating that an air interface based on the femto BS is to be disabled, and including an identifier of another BS that is accessible to the UE; and
disabling the air interfaces,
wherein the information about the out-of-service includes information about an expected time of shutting the service down.

9. A method for providing reliable service by a femto base station (BS) in a wireless communication system, the method comprising:
broadcasting, by the femto BS to user equipment (UE), information about out-of-service, the information indicating that an air interface based on the femto BS is to be disabled, and including an identifier of another BS that is accessible to the UE;
disabling the air interfaces; and
setting a cell bar indication for indicating that an entry into the femto BS is prevented.

10. The method of claim 9, wherein the cell bar indication is included in a secondary superframe header (S-SFH).

11. A method for receiving reliable service by user equipment (UE) in a wireless communication system, the method comprising:
receiving information about out-of-service by the UE from a femto base station (BS), the information about the out-of-service indicating that an air interface based on the femto BS is to be disabled, and
including an identifier of another BS that is accessible to the UE; and
accessing the another BS on the basis of the information about the out-of-service,
wherein the information about the out-of-service includes a reason for the out-of-service.

12. The method of claim 11, wherein the accessing includes transmitting a ranging request message for a handover, which includes the identifier of the another BS.

13. The method of claim 12, wherein the ranging request message is transmitted to the another BS or a neighboring BS of the femto BS.

14. The method of claim 11, wherein the information about the out-of-service is received through a broadcast message or a paging message.

15. The method of claim 11, wherein the another BS is a macro BS of which a cell region is overlapped with a cell region of the femto BS.

16. The method of claim 11, wherein the information about the out-of-service further includes information about an expected time of shutting the service down.

* * * * *